(12) United States Patent
Fujimoto (10) Patent No.: US 12,088,148 B2
(45) Date of Patent: Sep. 10, 2024

(54) HOUSING FOR AN ELECTRIC MOTOR

(71) Applicant: MINEBEA MITSUMI Inc., Nagano (JP)

(72) Inventor: Seiya Fujimoto, Nagano (JP)

(73) Assignee: MINEBEA MITSUMI Inc., Nagano (JP)

( * ) Notice: Subject to any disclaimer, the term of this patent is extended or adjusted under 35 U.S.C. 154(b) by 0 days.

(21) Appl. No.: 17/651,844

(22) Filed: Feb. 21, 2022

(65) Prior Publication Data

US 2022/0278577 A1   Sep. 1, 2022

(30) Foreign Application Priority Data

Feb. 26, 2021 (JP) ................. 2021-031029

(51) Int. Cl.
  *H02K 1/27* (2022.01)
  *H02K 1/2791* (2022.01)
  *H02K 1/30* (2006.01)
  *H02K 21/22* (2006.01)

(52) U.S. Cl.
  CPC ............. *H02K 1/30* (2013.01); *H02K 1/2791* (2022.01); *H02K 21/22* (2013.01)

(58) Field of Classification Search
  CPC ............ H02K 1/30; H02K 1/28; H02K 21/22; H02K 5/02; H02K 1/2786; H02K 5/00; H02K 5/04; H02K 5/15; H02K 1/2791
  USPC ............................................................ 310/89
  See application file for complete search history.

(56) References Cited

U.S. PATENT DOCUMENTS

| | | | | |
|---|---|---|---|---|
| 5,744,881 A * | 4/1998 | Ishizuka | ............. | H02K 1/2788 310/67 R |
| 6,664,684 B1 * | 12/2003 | Kobschaetzky | ....... | H02K 7/081 310/90 |
| 8,866,357 B2 * | 10/2014 | Yamasaki | ............. | H02K 5/225 310/71 |
| 2005/0109155 A1 * | 5/2005 | Oh | ........ | F16H 57/031 74/606 R |
| 2011/0187215 A1 * | 8/2011 | Sahara | ................ | H02K 5/1732 310/90 |
| 2017/0047795 A1 * | 2/2017 | Klassen | ............. | H02K 1/2773 |
| 2017/0302127 A1 * | 10/2017 | Sakuragi | ................ | H02K 11/33 |
| 2018/0205279 A1 * | 7/2018 | Linares | .................... | H02K 3/18 |

(Continued)

FOREIGN PATENT DOCUMENTS

| | | | | |
|---|---|---|---|---|
| CN | 201142624 Y | * | 10/2008 | |
| JP | 2008099368 A | * | 4/2008 | |
| JP | 2020016180 A | * | 1/2020 | ............... F04D 1/14 |

OTHER PUBLICATIONS

CN201142624_Machine_Translation (Year: 2008).*

(Continued)

*Primary Examiner* — Michael Andrews
*Assistant Examiner* — Masoud Vaziri
(74) *Attorney, Agent, or Firm* — Pearne & Gordon LLP (57) ABSTRACT

A motor according to the present application includes a rotor including a magnet, a yoke including an inner side surface around the magnet and having an annular shape, and a holder configured to hold the yoke. The yoke includes an end portion at the holder side in a rotating shaft (X) direction of the rotor. An outer side surface of the holder fits in an inner side surface of the yoke. The end portion of the yoke at the holder side and an outer side surface of the holder engage with each other.

8 Claims, 11 Drawing Sheets

(56) References Cited

U.S. PATENT DOCUMENTS

| | | | | |
|---|---|---|---|---|
| 2018/0338374 A1* | 11/2018 | Li | ................. | F04D 29/5813 |
| 2019/0131852 A1* | 5/2019 | Li | ................. | H02K 1/2786 |
| 2019/0193849 A1* | 6/2019 | Yu | ................. | B64C 27/32 |
| 2020/0083775 A1* | 3/2020 | Ortiz | ................. | H02K 5/22 |
| 2020/0136461 A1* | 4/2020 | Kebukawa | ............ | H02K 5/1735 |
| 2020/0153322 A1* | 5/2020 | Suda | ................. | H02K 15/12 |
| 2020/0259378 A1* | 8/2020 | Ueda | ................. | B64D 27/24 |

OTHER PUBLICATIONS

A Novel Double Rotor without Stator Electric Motor: Theoretical and Functional Aspects, (Year: 2017).*
Design and Analysis of Rotating Stator in Electrical Machine System, Journal of Engineering Science (Year: 2019).*
JP 2008099368 Machine Translation (Year: 2008).*

* cited by examiner

HOUSING FOR AN ELECTRIC MOTOR

CROSS-REFERENCE TO RELATED APPLICATIONS

This application claims the benefit of priority to Japanese Application No. JP2021-031029, filed Feb. 26, 2021, the entire disclosure of which is hereby incorporated herein by reference.

TECHNICAL FIELD

The present invention relates to a motor.

BACKGROUND ART

A disk driving motor configured to prevent heat deformation of a disk placement surface while fixing a yoke to a rotor hub in a balanced manner has been conventionally proposed (for example, see Patent Document 1).

In a disk driving motor in Patent Document 1, a field magnet is held inside a yoke body and an inner flange of a yoke having a cross-sectional L shape, and a protrusion of a rotor hub fits in an end surface at an inner peripheral side of the inner flange, and thus the rotor hub and the yoke are integrally attached.

CITATION LIST

Patent Literature

Patent Document 1: JP 2008-099368 A

SUMMARY OF INVENTION

Technical Problem

However, in the disk driving motor in Patent Document 1, the protrusion of the rotor hub only fits in the end surface at the inner peripheral side of the inner flange, and an attachment with high accuracy is not possible. Also, there has been a demand for a further reduction in thickness and weight.

The present invention has been made in view of the above situation, and an object of the present invention is to provide a motor with reduced thickness and weight.

Solution to Problem

The above problems are solved by the present invention described below. In other words, a motor according to the present invention includes a rotor including a magnet, a yoke including an inner side surface around the magnet and having an annular shape, and a holder configured to hold the yoke, wherein the yoke includes an end portion at the holder side in a rotating shaft direction of the rotor, an outer side surface of the holder fits in an inner side surface of the yoke, and the end portion of the yoke at the holder side and an outer side surface of the holder engage with each other.

An outer peripheral end portion of the holder preferably includes a protruding portion extending in a radial direction, and the yoke preferably includes a surface opposing an end surface of the protruding portion in the rotating shaft direction of the rotor.

The outer side surface of the holder preferably includes a step portion having a recessed shape, and the end portion of the yoke preferably engages with the step portion of the holder.

A part of the end portion of the yoke at the holder side engaging with the outer side surface of the holder is preferably deformed toward the holder, and a predetermined gap is preferably formed between the part of the end portion of the yoke at the holder side and an end portion of the magnet at the holder side in the rotating shaft direction of the rotor.

DESCRIPTION OF EMBODIMENTS

Overview of Embodiment

First, an overview of representative embodiments of the invention disclosed in the present application will be described. Note that, in the following description, reference signs in the drawings corresponding to the constituent elements of the invention are mentioned in parentheses as an example.

[1] A motor (1) according to a representative embodiment of the present invention includes a rotor (15) including a magnet (153), a yoke (151) including an inner side surface (151n) around the magnet (153) and having an annular shape, and a holder (17) configured to hold the yoke (151). The yoke (151) includes an end portion (152) at the holder side in a rotating shaft (X) direction of the rotor (15). An outer side surface (173mg) of the holder (17) fits in an inner side surface (151n) of the yoke (151). The end portion (152) of the yoke (151) at the holder side and an outer side surface (173mu) of the holder (17) engage with each other.

[2] An outer peripheral end portion (173) of the holder (17) includes a protruding portion (177) extending in a radial direction, and the yoke (151) includes a surface (151*kb*) opposing an end surface (177*b*) of the protruding portion (177) in the rotating shaft (X) direction of the rotor (15).

[3] The outer side surface (173*mu*, 173*mg*) of the holder (17) includes a step portion (174) having a recessed shape, and the end portion (152) of the yoke (151) engages with the step portion (174) of the holder (17).

[4] A part (152*s*) of the end portion (152) of the yoke (151) at the holder (17) side engaging with the outer side surface (173*mu*) of the holder (17) is deformed toward the holder (17), and a predetermined gap is formed between the part (152*s*) of the end portion (152) of the yoke (151) at the holder side and an end portion of the magnet (153) at the holder (17) side in the rotating shaft (X) direction of the rotor (15).

Next, embodiments of the present invention will be described with reference to the drawings.

Figure 1:
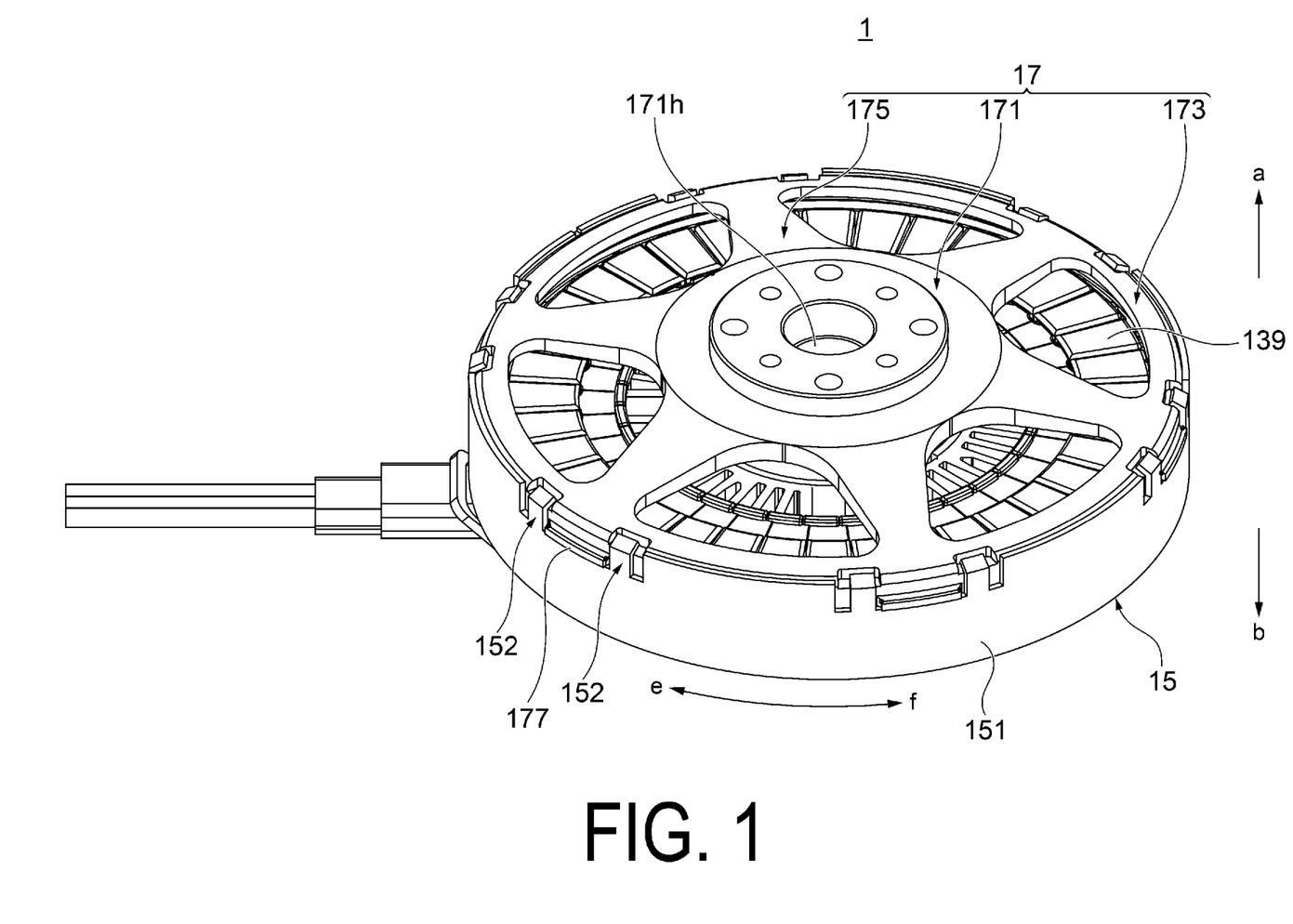
FIG. 1 is a perspective view illustrating an overall configuration of an outer rotor-type motor according to one embodiment of the present invention.
Figure 2:
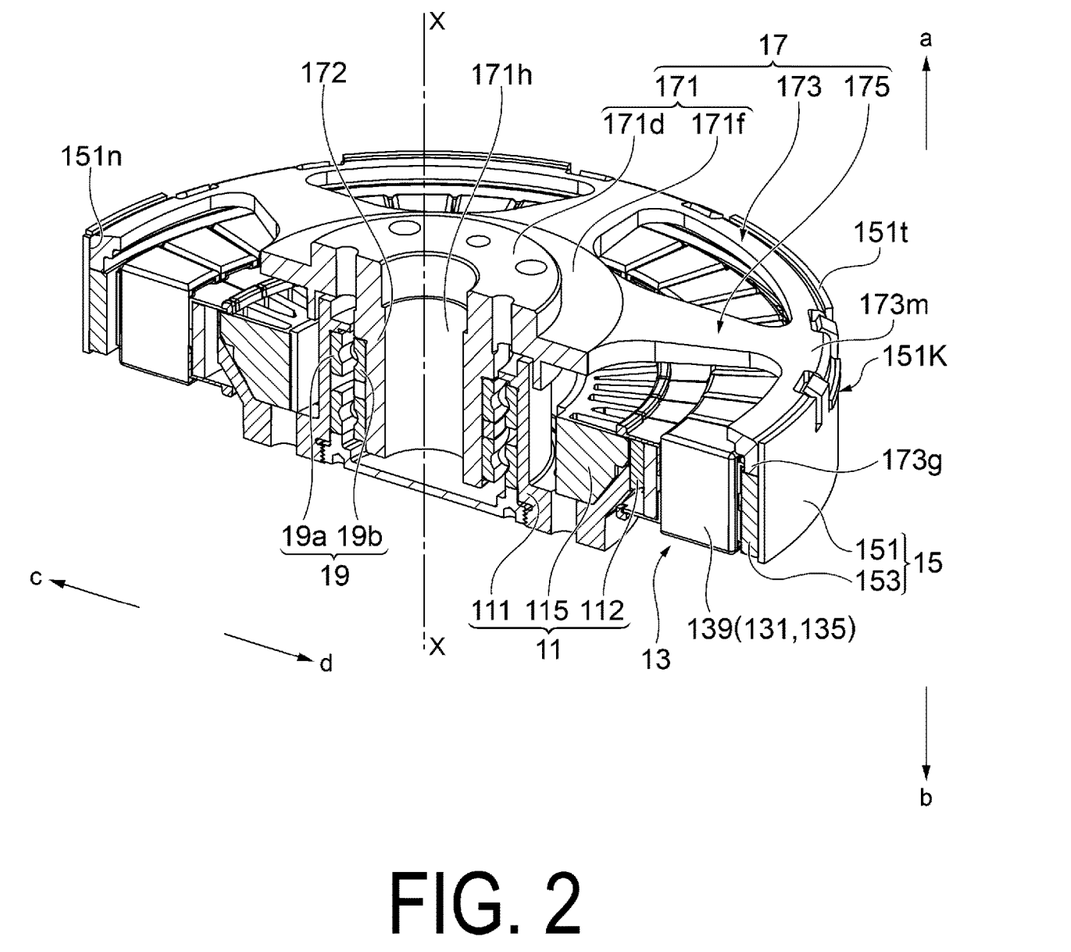
FIG. 2 is a cross-sectional perspective view of the motor according to one embodiment of the present invention.
Figure 3:
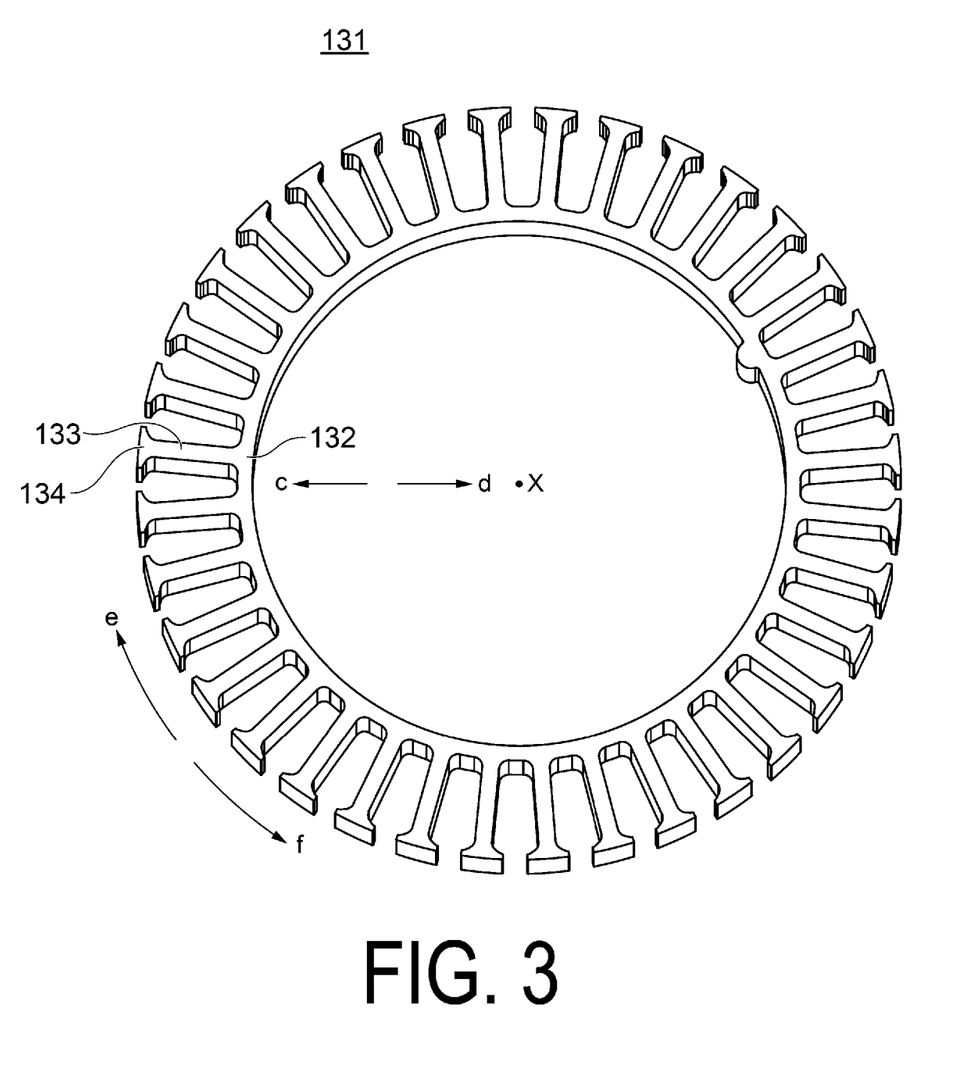
FIG. 3 is a perspective view illustrating an overall configuration of a stator core according to one embodiment of the present invention.
Figure 4:
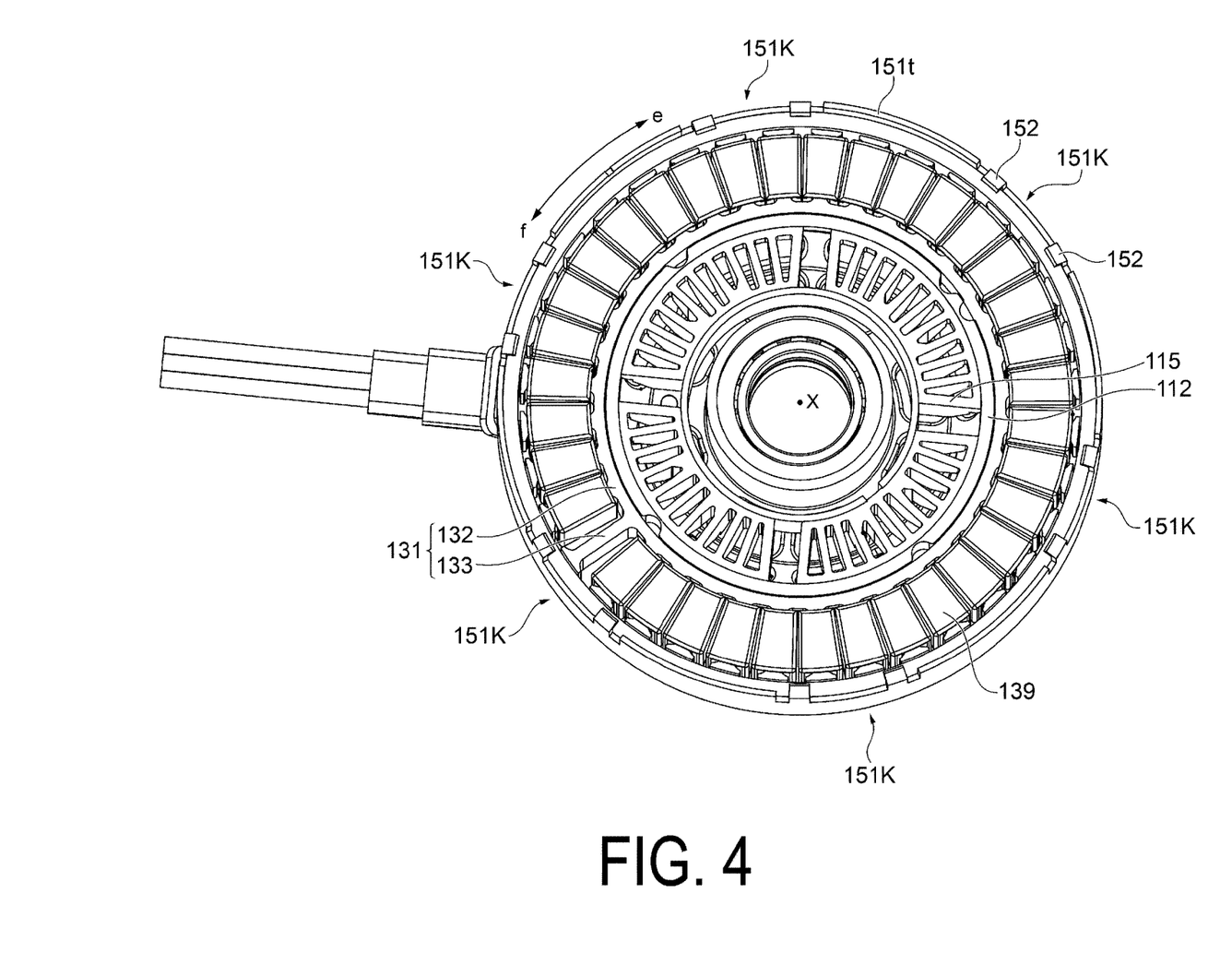
FIG. 4 is a perspective view illustrating a state before a holder of the motor according to one embodiment of the present invention is attached.
Figure 5:
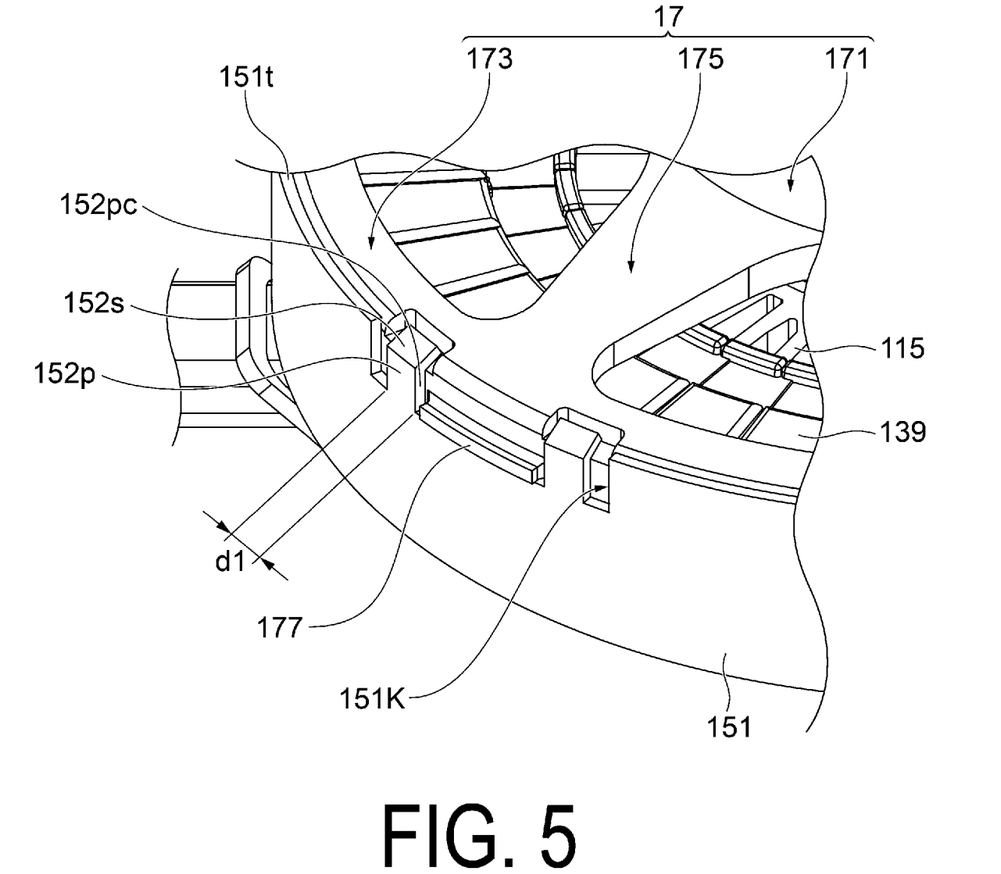
FIG. 5 is a partial perspective view illustrating a state where the holder of the motor according to one embodiment of the present invention is attached to a yoke.
Figure 6:
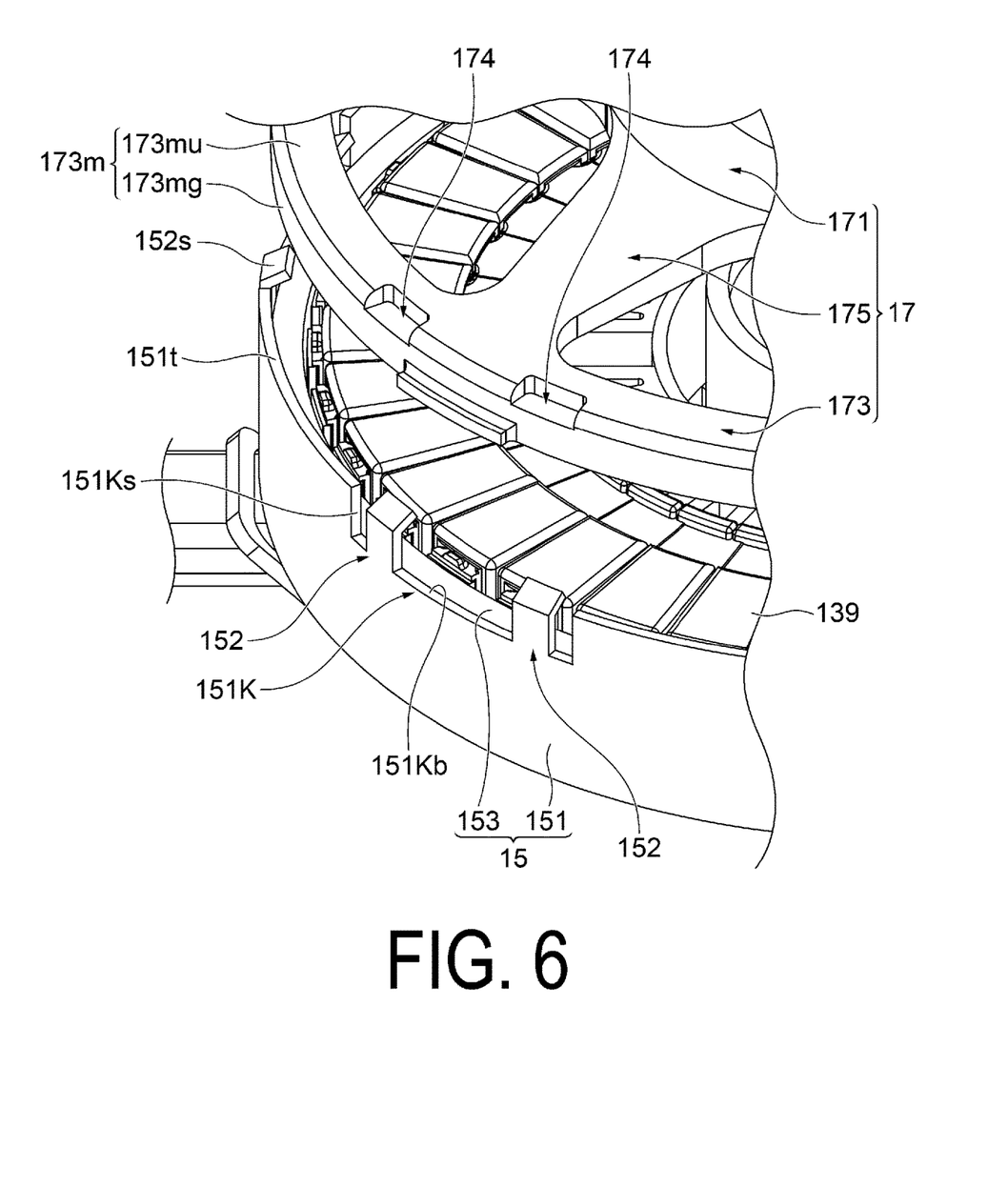
FIG. 6 is a perspective view illustrating a state before the holder of the motor according to one embodiment of the present invention is attached to the yoke.
Figure 7:
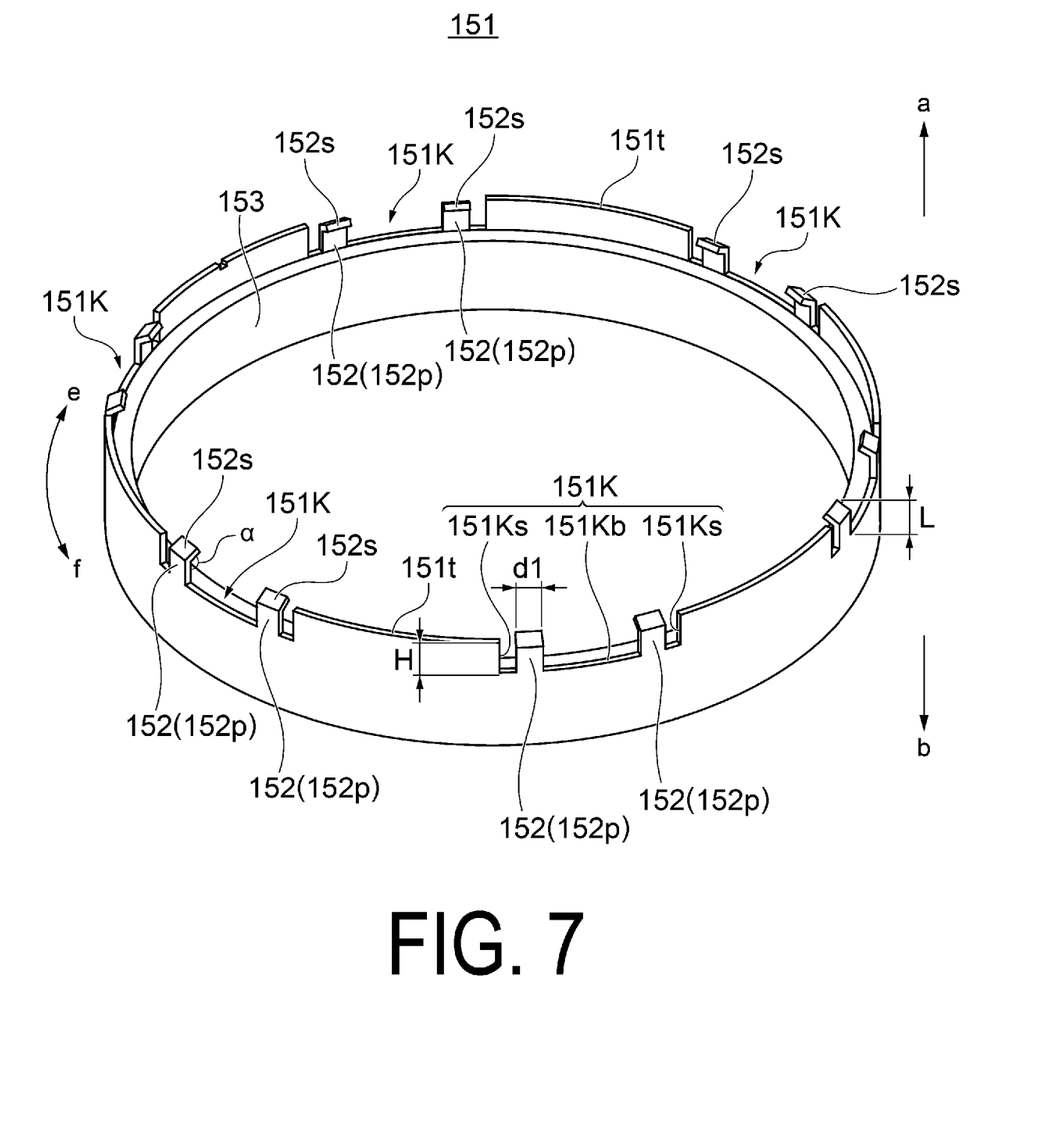
FIG. 7 is a perspective view illustrating an overall configuration of the yoke of the motor according to one embodiment of the present invention.
Figure 8:
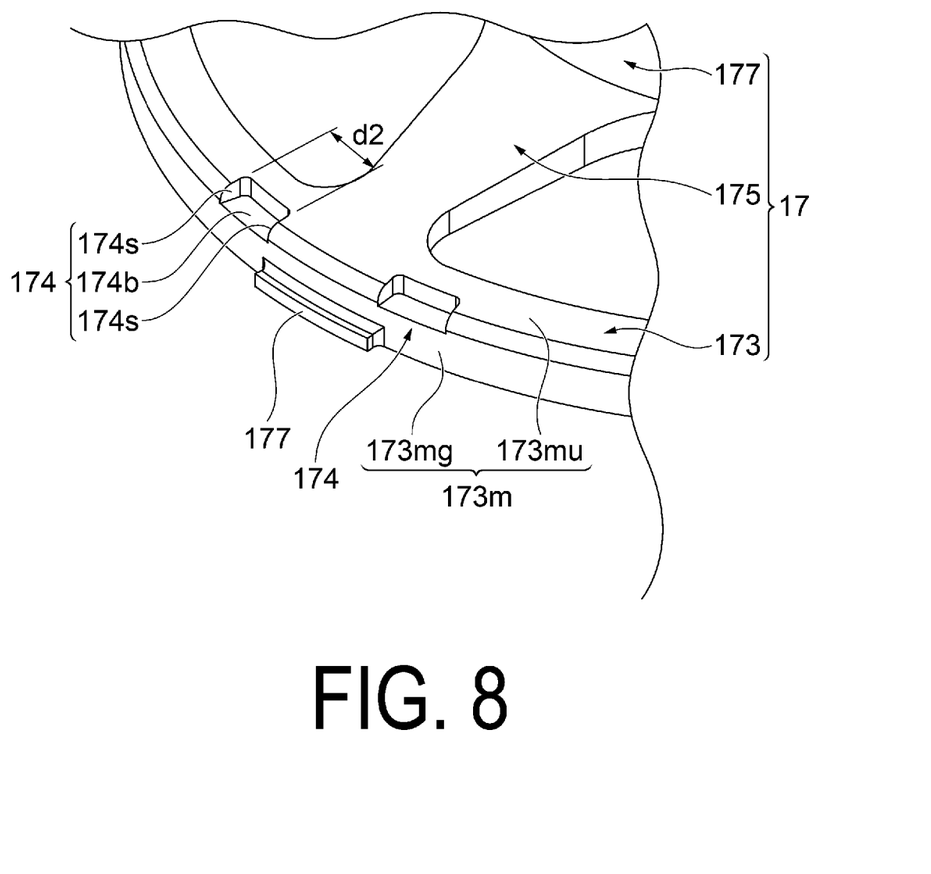
FIG. 8 is a partial perspective view illustrating a configuration of an outer peripheral end portion of the holder of the motor according to one embodiment of the present invention.
Figure 9:
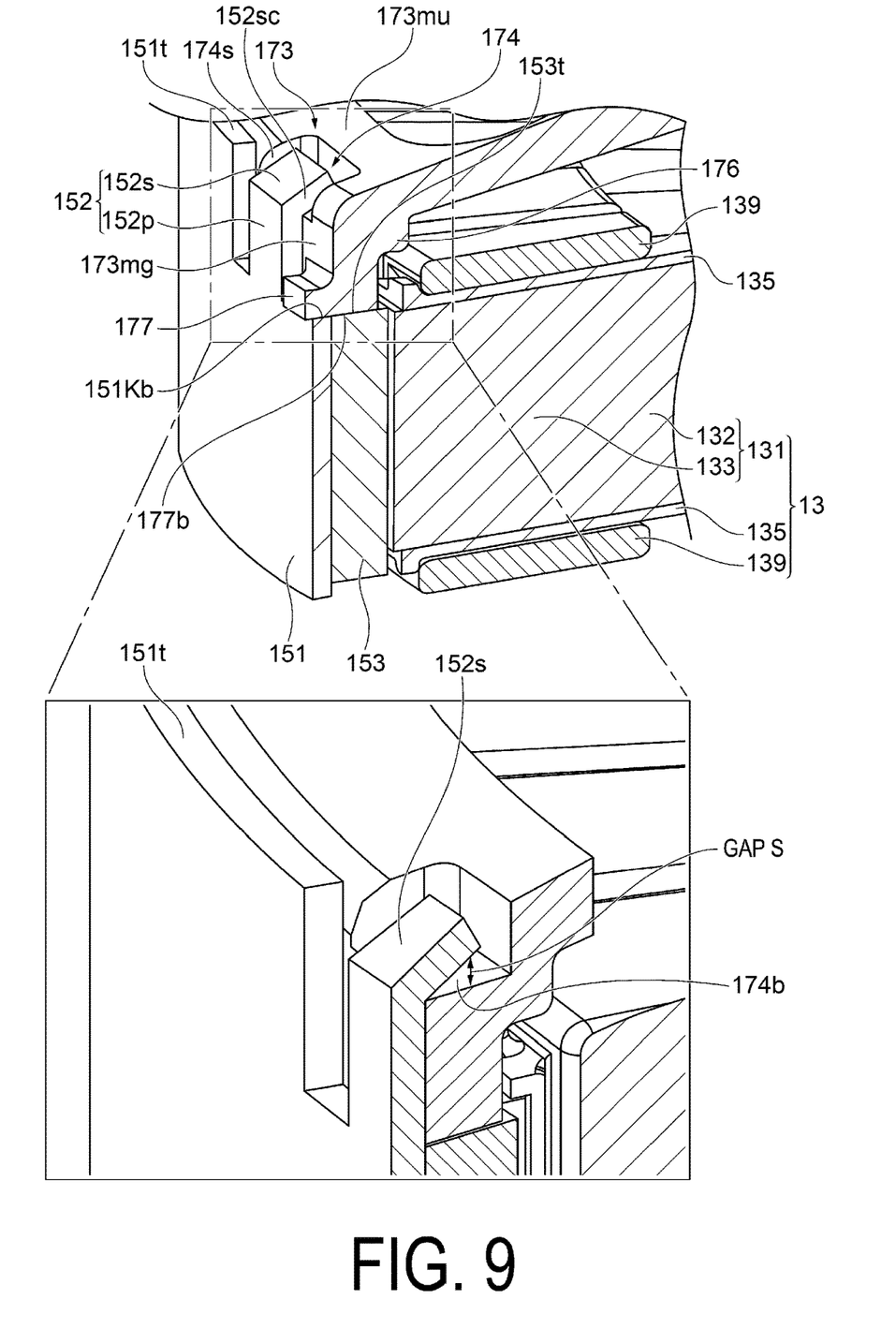
FIG. 9 is a partial cross-sectional perspective view illustrating a state where the holder and the yoke of the motor according to one embodiment of the present invention are integrally attached.

FIG. 1 is a perspective view illustrating an overall configuration of an outer rotor-type motor according to one embodiment of the present invention. FIG. 2 is a cross-sectional perspective view of the motor according to one embodiment of the present invention. FIG. 3 is a perspective view illustrating an overall configuration of a stator core according to one embodiment of the present invention. FIG. 4 is a perspective view illustrating a state before a holder of the motor according to one embodiment of the present invention is attached. FIG. 5 is a partial perspective view illustrating a state where the holder of the motor according to one embodiment of the present invention is attached to a yoke. FIG. 6 is a perspective view illustrating a state before the holder of the motor according to one embodiment of the present invention is attached to the yoke. FIG. 7 is a perspective view illustrating an overall configuration of the yoke of the motor according to one embodiment of the present invention. FIG. 8 is a partial perspective view illustrating a configuration of an outer peripheral end portion of the holder of the motor according to one embodiment of the present invention. FIG. 9 is a partial cross-sectional perspective view illustrating a state where the holder and the yoke of the motor according to one embodiment of the present invention are integrally attached.

Note that, in the description of the present embodiment, for the sake of convenience, an extending direction of an axial line X when a motor 1 rotates is defined as a rotating shaft X direction or an axial line X direction in the following description. Further, for the sake of convenience, in the rotating shaft X direction, an arrow a direction is defined as an upper side and an arrow b direction is defined as a lower side in the following description. In a radial direction perpendicular to the axial line X, an arrow c direction away from the axial line X is defined as an outer peripheral side, and an arrow d direction approaching the axial line X is defined as an inner peripheral side. In a peripheral direction of the motor 1, an arrow e direction is defined as a clockwise direction, and an arrow f direction is defined as a counter-clockwise direction. In the following description, the upper side (the arrow a direction) and the lower side (the arrow b direction) refer to an up and down relationship of the motor 1 in the drawings, and do not necessarily correspond to an up and down relationship in a gravitational direction.

As illustrated in FIGS. 1 to 10, the motor 1 is an outer rotor-type brushless motor installed on a floating-type mobile body such as a drone (not illustrated), for example. In the drone, an impact on an airframe during landing or falling has been known to damage the motor 1 for driving blades. Thus, the motor 1 according to the present embodiment has been designed lightweight in order to reduce the impact during landing or falling of the drone.

In the motor 1, a propeller (not illustrated) of the drone is attached to a holder 17 (FIG. 1) at the upper side (the arrow a direction), and the airframe of the drone is attached to a stator housing 11 (FIG. 2) at the lower side (the arrow b direction). As illustrated in FIG. 2, the motor 1 mainly includes the stator housing 11, a stator 13, a rotor 15, the holder 17, and a bearing 19.

The stator housing 11 includes an inner peripheral portion 111 having a cylindrical shape, an outer peripheral portion 112 having a cylindrical shape, and a coupling portion 115. The inner peripheral portion 111 of the stator housing 11 is formed in a cylindrical shape or a substantially cylindrical shape extending in the rotating shaft X direction. The inner peripheral portion 111 holds two bearings 19 at a surface at the inner peripheral side (the arrow d direction) (hereinafter referred to as an "inner peripheral surface").

Specifically, the inner peripheral portion 111 holds the bearing 19 at each of the upper side (the arrow a direction) and the lower side (the arrow b direction) in the rotating shaft X direction. In this case, an outer ring 19*a* of the bearing 19 is fixed to the inner peripheral surface of the inner peripheral portion 111 of the stator housing 11 by using an adhesive. Note that the means for fixing is not limited to this, and the outer ring 19*a* of the bearing 19 may be press-fitted to be fixed to the inner peripheral surface of the inner peripheral portion 111 of the stator housing 11.

In other words, the inner peripheral portion 111 of the stator housing 11 functions as a bearing holder with respect to the two bearings 19. The bearing 19 is, for example, a ball bearing. However, the bearing 19 is not limited to this, and any of other various bearings such as a sleeve bearing, for example, may be used.

Similarly to the inner peripheral portion 111, the outer peripheral portion 112 of the stator housing 11 is formed in a cylindrical shape or a substantially cylindrical shape extending in the rotating shaft X direction. Both of the inner peripheral portion 111 and the outer peripheral portion 112 include the axial line X as a center axis. The length of the outer peripheral portion 112 in the rotating shaft X direction may be shorter than the length of the inner peripheral portion 111 in the rotating shaft X direction.

The coupling portion 115 is integrally formed with the inner peripheral portion 111 and the outer peripheral portion 112 between the inner peripheral portion 111 and the outer peripheral portion 112 of the stator housing 11. The coupling portion 115 couples the inner peripheral portion 111 and the outer peripheral portion 112 to each other. The coupling portion 115 extends from an end portion of the inner peripheral portion 111 at the outer peripheral side to the outer peripheral side (the arrow c direction), and is connected to an end portion of the outer peripheral portion 112 at the inner peripheral side.

A stator core 131 of the stator 13 is fixed to a surface of the outer peripheral portion 112 at the outer peripheral side (hereinafter referred to as an outer peripheral surface). As illustrated in FIG. 9, the stator 13 includes the stator core 131, an insulator 135, and a coil 139.

The stator core 131 (FIGS. 3 and 4) is a laminated body of silicon steel plates or the like as a magnetic body, and includes an annular portion 132, a plurality of coupling portions 133 extending from the annular portion 132 to the outer peripheral side (the arrow c direction side), and a magnetic pole portion 134 connected to each of the coupling portions 133. In other words, the coupling portion 133 forming a part of the stator core extending in the radial direction is located between the annular portion 132 and the magnetic pole portion 134. The annular portion 132, the magnetic pole portions 134, and the coupling portions 133 function as a yoke.

An inner peripheral surface of the annular portion 132 of the stator core 131 is fixed to the outer peripheral surface of the outer peripheral portion 112 of the stator housing 11. Further, the magnetic pole portion 134 of the stator core 131 protrudes in the clockwise direction (the arrow e direction) and the counterclockwise direction (the arrow f direction) in the peripheral direction, and a gap between adjacent magnetic pole portions 134 is smaller than a gap (a slot) between adjacent coupling portions 133.

The insulator 135 (FIG. 9) formed of an insulating member is mounted at the coupling portion 133 of the stator core 131. The coil 139 is wound around the coupling portion 133 via the insulator 135. The coupling portion 133 of the stator core 131 and the coil 139 are electrically insulated via the insulator 135. Note that a resin film having an insulating property may be formed at a surface of the stator core 131, and the resin film may be used as the insulator.

The rotor 15 (FIG. 2) includes a yoke 151 and a magnet 153. The yoke 151 is an iron core having an annular shape and a cylindrical shape extending in the rotating shaft X direction. The yoke 151 integrally holds the magnet 153 in a state where the magnet 153 is surrounded. The yoke 151 prevents leakage of a magnetic field of the magnet 153, and is formed of a magnetic body such as iron.

A plurality of (in this case, for example, six) recess portions 151K (FIG. 7) formed at a given interval in the peripheral direction are formed at an end portion of the yoke 151 at the upper side (the arrow a direction) in the rotating shaft X direction.

The plurality of recess portions 151K have a shape recessed in a rectangular shape or a U shape from an end surface (hereinafter referred to as an "upper end surface") 151t of the yoke 151 at the holder 17 side (the arrow a direction).

The recess portion 151K is formed of a bottom surface 151Kb forming the recess portion 151K and two side surfaces 151Ks opposing each other in the peripheral direction. Further, the yoke 151 includes two end portions (also referred to as protruding portions) 152 extending in, as a longitudinal direction, a direction from the bottom surface 151Kb of the recess portion 151K toward the holder 17 at the upper side (the arrow a direction). In other words, the yoke 151 includes, at the recess portion 151K, the two end portions 152 provided at the holder 17 side of the yoke 151. Note that the number of the end portions 152 is not limited to two, and the plurality of end portions 152 may be formed at the recess portion 151K.

The two end portions 152 formed at the recess portion 151K are formed at positions away from each other by a predetermined distance at the bottom surface 151Kb of the recess portion 151K. The length (height) of the two end portions 152 in the rotating shaft X direction is almost the same as a distance H from the bottom surface 151Kb of the recess portion 151K to the upper end surface 151t of the yoke 151, i.e., a height (depth) of the recess portion 151K.

Note that a length (height) L of the end portion 152 may be the same as, greater than, or smaller than the height (depth) of the recess portion 151K. A width d1 (FIG. 5) of the two end portions 152 in the peripheral direction can be set to any value in terms of strength. The thickness of the two end portions 152 in the radial direction is the same as the thickness of the yoke 151 in the radial direction.

The end portion 152 includes a body portion 152p extending from the bottom surface 151Kb of the recess portion 151K toward the upper side (the arrow a direction), and a tip portion 152s including a part of the body portion 152p at the holder 17 side, i.e., the upper side (the arrow a direction) bent to be deformed toward an inner peripheral side of the yoke 151.

The tip portion 152s of the end portion 152 is bent such that an angle α at a smaller side between the tip portion 152s and the body portion 152p is an acute angle (for example, 50 degrees to 70 degrees), and includes a bent portion. In this way, the end portion 152 can engage with an outer side surface 173m (FIGS. 6 and 8) of an outer peripheral end portion 173 of the holder 17 described later.

Herein, when the holder 17 is attached to the yoke 151, the tip portion 152s of the end portion 152 and an end portion of the magnet 153 at the upper side (the arrow a direction) held by an inner side surface 151n of the yoke 151 are located away from each other by a predetermined distance. In other words, a height of the body portion 152p is set such that the tip portion 152s of the end portion 152 and the magnet 153 of the yoke 151 are located away from each other by the predetermined distance.

In this way, the end portion 152 and the end portion of the magnet 153 at the upper side (the arrow a direction) are located away from each other by the predetermined distance. Thus, when the tip portion 152s is bent, an effect on the performance of a magnetic circuit formed of the coil 139, the magnet 153, and the yoke 151 (the stator core 131), due to an effect of residual stress remaining in the end portion 152 on a magnetic property of the yoke 151, can be suppressed. In this way, the motor 1 can suppress a decrease in the performance of the motor itself due to the effect on the magnetic property at the end portion 152 of the yoke 151.

The magnet 153 (FIG. 7) is fixed to the inner surface (hereinafter referred to as the "inner side surface") 151n of the yoke 151 by using an adhesive, and the magnet 153 is held at the yoke 151. The inner side surface 151n of the yoke 151 is formed with high accuracy by cutting of cutting processing. However, the present invention is not limited to this, and the inner side surface 151n of the yoke 151 may be formed with high accuracy by roll molding and the like. Further, the magnet 153 may be held in contact with the inner surface 151n of the yoke 151 by press fitting and the like, for example.

The magnet 153 has a cylindrical shape extending in the rotating shaft X direction similarly to the yoke 151. The magnet 153 is held, by using an adhesive and the like, at the inner side surface 151n of the yoke 151 formed with high accuracy.

The magnet 153 is an integrally molded product of a magnetic body. In the magnet 153, an inner peripheral surface of the stator core 131 opposing the magnetic pole portion 134 is divided into a region magnetized to the south pole and a region magnetized to the north pole to be alternately disposed along the peripheral direction. The height of the magnet 153 in the rotating shaft X direction is formed lower than the height of the yoke 151 in the rotating shaft X direction.

Herein, a surface (hereinafter referred to as an "upper end surface") 153t of an end portion at the upper side of the magnet 153 in the rotating shaft X direction is flush with the bottom surface 151Kb of the recess portion 151K. Note that the upper end surface 153t of the magnet 153 may be located lower than the bottom surface 151Kb of the recess portion 151K.

In other words, the magnet 153 may be held in a state where an end portion at the upper side (the arrow a direction) (hereinafter referred to as an "upper end portion") and an end portion at the lower side (the arrow b direction) (hereinafter referred to as a "lower end portion") are covered by the yoke 151 in the rotating shaft X direction.

The holder 17 is formed of a relatively light metal such as an aluminum alloy, and has a disk shape on the whole. However, the present invention is not limited to this, and the holder 17 may be formed of another material such as resin and plastic. Note that the holder 17 is also formed with high accuracy by cutting of cutting processing. However, the present invention is not limited to this, and the holder 17 may be formed by press molding and the like.

As illustrated in FIGS. 1 and 2, the holder 17 includes an inner peripheral portion 171 provided at the inner peripheral side (the arrow d direction), the outer peripheral end portion 173 provided at an end portion of the outer peripheral side (the arrow c direction), and spokes 175.

The inner peripheral portion 171 of the holder 17 includes a columnar protruding portion 171d having a through hole 171h with the axial line X as the center, and a flange portion 171f extending from an end portion of the protruding portion 171d at the outer peripheral side in the radial direction. The flange portion 171f has a size capable of covering the inner peripheral portion 111 of the stator housing 11 from the upper side (the arrow a direction).

The protruding portion 171d of the inner peripheral portion 171 includes an inner tubular portion 172 in a cylindrical shape extending in an up and down direction (the arrow ab direction) with the axial line X as the center. An inner ring 19b of the bearing 19 is held at an outer peripheral surface of the inner tubular portion 172. In other words, the inner tubular portion 172 of the holder 17 functions as a rotating shaft in the motor 1. Note that the inner tubular portion 172 may have a solid columnar shape.

A plurality of (for example, six) the spokes 175 are connected to an end portion of the flange portion 171f at the outer peripheral side (the arrow c direction), and the annular outer peripheral end portion 173 is connected to a tip portion of each of the spokes 175 in the radial direction. In other words, the spokes 175 connect the flange portion 171f of the inner peripheral portion 171 and the outer peripheral end portion 173.

The outer peripheral end portion 173 includes the outer side surface 173m at an end portion at the outer peripheral side (the arrow c direction) in the radial direction. The outer side surface 173m of the outer peripheral end portion 173 is formed of a first outer side surface portion 173mu (FIG. 6) in an annular shape covering, from the upper side (the arrow a direction), the magnet 153 fixed to the inner side surface 151n of the yoke 151, and a second outer side surface portion 173mg (FIG. 6) extending from an end edge of the first outer side surface portion 173mu at the outer peripheral side toward the lower side (the arrow b direction) along the rotating shaft X direction.

Particularly, the second outer side surface portion 173mg of the outer side surface 173m of the outer peripheral end portion 173 is also formed with high accuracy by cutting of cutting processing as described above. Thus, when the holder 17 is press-fitted in the yoke 151, the second outer side surface portion 17 mg in the outer peripheral end portion 173 of the holder 17 and the inner side surface 151n of the yoke 151 are attached with high accuracy in a close contact state.

The outer peripheral end portion 173 of the holder 17 includes two or more step portions 174. At the plurality of step portions 174, a step is formed in a recessed shape at an end portion being a portion of the outer side surface 173m opposing the spokes 175. The plurality of step portions 174 are recessed spaces being recessed in a substantially rectangular parallelepiped shape across both of the first outer side surface portion 173mu and the second outer side surface portion 173mg of the outer side surface 173m.

Two step portions 174 are provided in positions away from each other by a predetermined interval. The interval between one of the step portions 174 and the other step portion 174 is almost the same as the interval between the two end portions 152 of the yoke 151. In other words, the two step portions 174 and the two end portions 152 can be disposed so as to oppose each other.

The step portions 174 (FIG. 8) engage with the tip portions 152s of the two end portions 152 of the yoke 151. The step portion 174 is formed of a bottom surface 174b and two side surfaces 174s opposing each other, and the bottom surface 174b and the two side surfaces 174s form a recessed space. The bottom surface 174b of the step portion 174 is a surface opposing the tip portion 152s of the yoke 151 engaging with the step portion 174. In an example in FIG. 9, a predetermined gap S is formed between the bottom surface 174b and the tip portion 152s, and the bottom surface 174b and the tip portion 152s are not in contact with each other. Note that the bottom surface 174b and the tip portion 152s may be in contact with each other, and the step portion 174 of the holder 17 and the end portion 152 of the yoke 151 may engage with each other to fix the holder 17 and the yoke 151 together.

The two side surfaces 174s (FIG. 9) forming the recessed space of the step portion 174 are vertical surfaces extending toward the holder 17 with respect to the bottom surface 174b, and are surfaces each opposing a side surface 152sc of the tip portion 152s of the end portion 152 in the peripheral direction described above. A distance d2 (FIG. 8) between the two side surfaces 174s of the step portion 174 may be almost the same as or greater than the width d1 of the end portion 152.

Note that, in a state where the holder 17 is attached to the yoke 151, when the motor 1 rotates in the peripheral direction (an arrow of direction), the side surface 174s of the step portion 174 of the holder 17 and the side surface 152sc of the tip portion 152s of the end portion 152 formed at the recess portion 151K of the yoke 151 may come into contact with each other to prevent misalignment of the holder 17 with respect to the yoke 151 in the peripheral direction.

The outer peripheral end portion 173 includes, between the two step portions 174, a protruding portion 177 extending from an end edge of the second outer side surface portion 173mg at the lower side (the arrow b direction) toward the outer peripheral side (the arrow c direction) in the radial direction. The protruding portion 177 has such a length as to not protrude from a surface of the yoke 151 at the outer peripheral side when the holder 17 is attached to the yoke 151.

The protruding portion 177 has a function as a portion configured to receive an impact received by the yoke 151 of the motor 1 during landing or falling of the drone. Note that a protruding portion 176 (FIG. 9) for improving strength of the protruding portion 177 is provided at a surface of the outer peripheral end portion 173 opposite to the first outer side surface portion 173mu, i.e., at a surface opposing the stator core 131 side. The protruding portion 177 may function as a cushion portion capable of receiving an impact without damaging the protruding portion 177 by presence of the protruding portion 176.

The protruding portion 177 of the outer peripheral end portion 173 includes a flat surface (hereinafter referred to as a "lower end surface") 177b at the yoke 151 side (the arrow b direction). The lower end surface 177b of the protruding portion 177 is a surface opposing the bottom surface 151Kb forming the recess portion 151K of the yoke 151 and an end surface (hereinafter referred to as an "upper end surface") 153t of the magnet 153 at the upper side (the arrow a direction).

Therefore, when the holder 17 is attached to the yoke 151, the lower end surface 177b of the protruding portion 177 of the outer peripheral end portion 173 and the bottom surface 151Kb forming the recess portion 151K of the yoke 151 are fixed together in contact with each other.

The bottom surface 151Kb of the recess portion 151K and the upper end surface 153t of the magnet 153 oppose the lower end surface 177b of the protruding portion 177 in the rotating shaft direction, and thus the bottom surface 151Kb may serve as a positioning portion such that the magnet 153 is located closer to the lower side than the bottom surface 151Kb of the recess portion 151K of the yoke 151.

Note that, when the magnet 153 is held by the inner side surface 151n of the yoke 151, the upper end surface 153t of the magnet 153 may be disposed closer to the lower side (the arrow b direction) than the bottom surface 151Kb of the recess portion 151K. In other words, the lower end surface 177b of the protruding portion 177 of the outer peripheral end portion 173 and the bottom surface 151Kb forming the recess portion 151K may be in contact with each other, and the magnet 153 may be located closer to the lower side (the arrow b direction) than the bottom surface 151Kb of the recess portion 151K.

With the configuration described above, in the motor 1, when the holder 17 is attached to the yoke 151, the second outer side surface portion 173mg of the outer peripheral end portion 173 of the holder 17 is disposed with respect to the inner side surface 151n of the yoke 151, and a part of the end portion 152 of the yoke 151 is deformed to engage with the outer peripheral end portion 173 of the holder 17 and be fixed. Thus, the holder 17 can be assembled in the yoke 151 with a simple configuration.

In the motor 1, when the holder 17 is inserted into the yoke 151, the step portion 174 of the outer peripheral end portion 173 of the holder 17 is disposed closer to the lower side (the arrow b direction) than the upper end surface 151t of the yoke 151, and the step portion 174 of the outer peripheral end portion 173 and the end portion 152 provided at the recess portion 151K engage with each other. In this way, the motor 1 can have a height in the rotating shaft X direction smaller than in the prior art, and can thus be reduced in thickness on the whole.

For example, the second outer side surface portion 173mg of the outer side surface 173m of the outer peripheral end portion 173 of the holder 17 may be formed with high accuracy by cutting of cutting processing, the inner side surface 151n of the yoke 151 may be formed with high accuracy by cutting of cutting processing, and the outer peripheral end portion 173 of the holder 17 may fit in the inner side surface 151n of the yoke 151 by press fitting. In the motor 1, assembly accuracy of the holder 17 and the yoke 151 can be improved.

Further, in the motor 1, when the holder 17 is inserted into the yoke 151, the two end portions 152 provided at the recess portion 151K of the yoke 151 engage with the step portions 174 provided at the outer peripheral end portion 173 of the holder 17. In this way, the holder 17 and the yoke 151 can be firmly fixed together.

In the motor 1, the lower end surface 177b of the protruding portion 177 of the holder 17, and the bottom surface 151Kb of the recess portion 151K of the yoke 151 and the upper end surface 153t of the magnet 153 may oppose or be in contact with each other. In this case, the protruding portion 177 of the holder 17 can serve as a positioning portion of the yoke 151 and the magnet 153 in the rotating shaft X direction.

The holder 17 and the yoke 151 can be formed of different members, and a reduction in weight of the motor 1 can be achieved. For example, the holder 17 is formed of a relatively light metal member, the yoke 151 is formed of a heavier magnetic member than the holder 17, and thus a reduction in weight of the motor 1 can be achieved while securing the magnetic property of the yoke 151 constituting the magnetic circuit.

Furthermore, when the motor 1 is used in an application of a floating-type mobile body such as a drone, with the presence of the protruding portion 177 provided at the outer peripheral end portion 173 of the holder 17, an impact transmitted via the yoke 151 during landing or falling can be absorbed by the protruding portion 177. In this way, as compared with a holder without the protruding portion 177 being provided, impact resistance can be improved and a risk of damage can be reduced.

Furthermore, in the motor 1, in a state where the holder 17 and the yoke 151 are integrated, the tip portion 152s of the end portion 152 formed at the recess portion 151K of the yoke 151 and the end portion of the magnet 153 at the upper side (the arrow a direction) held at the inner side surface 151n of the yoke 151 are located away from each other by the predetermined distance in the rotating shaft X direction.

In this way, the motor 1 can suppress a decrease in performance of the magnetic circuit formed of the coil 139, the magnet 153, and the yoke 151 (the stator core 131) due to an effect of residual stress when the end portion 152 is bent on the magnetic property of the yoke 151.

According to the configuration described above, in the motor 1, the holder 17 and the yoke 151 can be attached to each other easily, firmly, or with high accuracy by engaging, fixing by press fitting, or fitting.

Further, the coupling portion 115 of the stator housing 11 may serve as a heat dissipation member configured to dissipate heat of the stator to the outside. By using the coupling portion 115 as the heat dissipation member, the heat of the stator can be efficiently dissipated to the outside. Further, by cooling the coupling portion 115 with a blade attached to the motor 1, heat dissipation can also be actively performed.

Note that the motor 1 according to the present embodiment is configured as an outer rotor-type brushless motor, but the present invention can also be applied to a motor other than a brushless motor. Further, the present invention can also be applied to an inner rotor-type motor.

Figure 10:
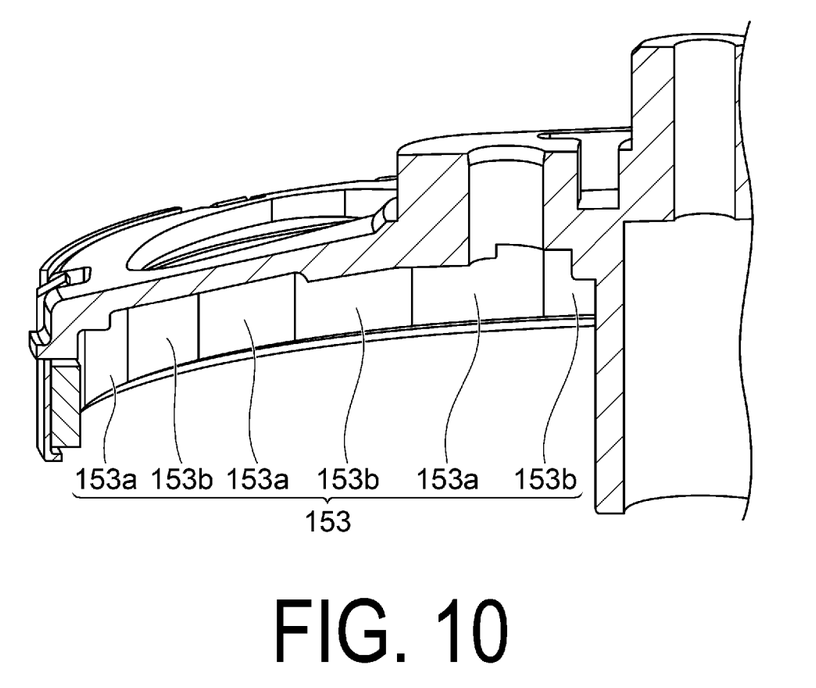
FIG. 10 is a partial cross-sectional perspective view illustrating a configuration of a magnet according to another embodiment of the present invention.

As described above, the motor according to the present invention has been described with reference to a preferred embodiment, but the motor according to the present invention is not limited to the configuration of the embodiment described above. For example, in the present embodiment, a case where the magnet 153 is formed in an annular shape has been described, but the present invention is not limited to this case. As illustrated in FIG. 10, in the magnet 153, the inner peripheral surface opposing the magnetic pole portion 134 of the stator core 131 may be divided into a segment 153a magnetized to the south pole and a segment 153b magnetized to the north pole alternately disposed along the peripheral direction and formed as an aggregate.

Figure 11:
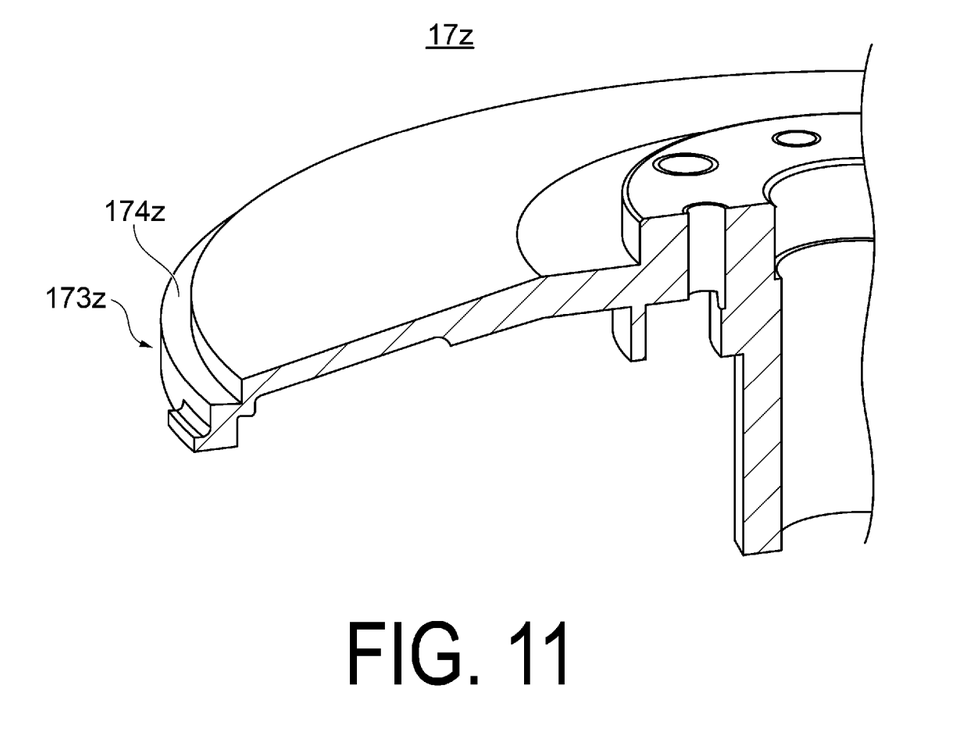
FIG. 11 is a partial cross-sectional perspective view illustrating a configuration of a holder according to another embodiment of the present invention.

Further, in the present embodiment, a case where the holder 17 including the spokes 175 is used has been described, but the present invention is not limited to this case. As illustrated in FIG. 11, a holder 17Z having a disk shape without a spoke may be used.

In this case, the holder 17Z is not provided with the step portion 174 (FIGS. 6 and 8) in a recessed shape formed of the recessed space, and the end portion 152 formed at the recess portion 151K of the yoke 151 may engage with a step portion 174Z of an outer peripheral end portion 173Z formed in a step shape.

In addition, the motor according to the present invention may be appropriately modified by a person skilled in the art according to conventionally known knowledge. Such modifications are of course included in the scope of the present invention as long as these modifications still include the configuration of the present invention.

REFERENCE SIGNS LIST

1 Motor
11 Stator housing
13 Stator
15 Rotor
17, 17Z Holder
19 (19a, 19b) Bearing
111 Inner peripheral portion
112 Outer peripheral portion
115 Coupling portion
131 Stator core
132 Annular portion
133 Coupling portion
135 Insulator
139 Coil
151 Yoke
151t Upper end surface
151n Inner side surface
151K Recess portion
151Kb Bottom surface
151Ks Side surface
152 End portion (protruding portion)
152p Body portion
152s Tip portion
152sc Side surface
153 Magnet
153t Upper end surface
171 Inner peripheral portion
171d Protruding portion
171f Flange portion
171h Through hole
172 Inner tubular portion
173 Outer peripheral end portion
173m Outer side surface
173mu First outer side surface portion
173mg Second outer side surface portion
174 Step portion
174b Bottom portion
174s Side surface
175 Spoke
176 Protruding portion
177 Protruding portion
177b Lower end surface.

The invention claimed is:

1. A motor, comprising
a rotor including a magnet, a yoke including an inner side surface around the magnet and having an annular shape, and a holder configured to hold the yoke, and
a stator including a coil, wherein
the yoke includes an end portion at the holder side in a rotating shaft direction of the rotor,
the holder includes an outer side surface and a surface in the stator side, the surface in the stator side being opposite to the outer side surface in a rotating shaft direction of the rotor,
the outer side surface includes a first outer side surface portion,
the first outer side surface portion covers the magnet in the rotating shaft direction of the rotor and extends in a radial direction,
the yoke surrounds the first outer side surface portion in the radial direction, and
the first outer side surface portion fits in an inner side surface of the yoke, and
the end portion of the yoke at the holder side and the first outer side surface portion engage with each other.

2. The motor according to claim 1, wherein
the outer side surface includes a second outer side surface portion,
the second outer side surface portion extends in the rotating shaft direction of the rotor,
the second outer side surface portion includes a protruding portion extending in a radial direction, and
the yoke includes a surface opposing an end surface of the protruding portion in the rotating shaft direction of the rotor.

3. The motor according to claim 1, wherein
the holder includes an inner peripheral portion, an outer peripheral end portion including the outer side surface and a spoke connecting the inner peripheral portion and the outer peripheral end portion,
the first outer side surface portion includes step portions having recessed shapes, and
the spoke is arranged between the step portions in the radial direction,
the end portions of the yoke engage with the step portions of the holder.

4. The motor according to claim 1, wherein
a part of the end portion of the yoke at the holder side engaging with the outer side surface of the holder is deformed toward the holder, and
a predetermined gap is formed between the part of the end portion of the yoke at the holder side and an end portion of the magnet at the holder side in the rotating shaft direction of the rotor.

5. A motor, comprising
a rotor including a magnet,
a yoke including an inner side surface around the magnet and having an annular shape, and
a holder configured to hold the yoke, and
a stator including a coil,
wherein the yoke includes an end portion at the holder side in a rotating shaft direction of the rotor,
the holder includes an inner peripheral portion, an outer peripheral end portion including an outer side surface and a spoke connecting the inner peripheral portion and the outer peripheral end portion,
the outer side surface includes step portions having recessed shapes, and
the spoke is arranged between the step portions in the radial direction,
the end portions of the yoke engage with the step portions of the holder.

6. The motor according to claim 5, wherein
the outer side surface includes a first outer side surface portion,
the first outer side surface portion covers the magnet in the rotating shaft direction and extends in the radial direction,
the yoke surrounds the first outer side surface portion in a radial direction, and
the first outer side surface portion fits in an inner side surface of the yoke, and
the end portion of the yoke at the holder side and the first outer side surface portion of the holder engage with each other.

7. The motor according to claim 5, wherein
the outer side surface includes a second outer side surface portion,
the second outer side surface portion extends in the rotating shaft direction of the rotor,
the second outer side surface portion includes a protruding portion extending in a radial direction, and
the yoke includes a surface opposing an end surface of the protruding portion in the rotating shaft direction of the rotor.

8. The motor according to claim 5, wherein
a part of the end portion of the yoke at the holder side engaging with the outer side surface of the holder is deformed toward the holder, and
a predetermined gap is formed between the part of the end portion of the yoke at the holder side and an end portion of the magnet at the holder side in the rotating shaft direction of the rotor.

\* \* \* \* \*